(12) United States Patent
Ma et al.

(10) Patent No.: US 11,967,116 B2
(45) Date of Patent: Apr. 23, 2024

(54) METHOD FOR CHARACTERIZING POLARIZATION IMAGE INFORMATION AND METHOD FOR COMPUTING CHARACTERIZATION PARAMETERS

(71) Applicant: HUAZHONG UNIVERSITY OF SCIENCE AND TECHNOLOGY, Hubei (CN)

(72) Inventors: Donglin Ma, Hubei (CN); Yiming Yan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 511 days.

(21) Appl. No.: 17/213,135

(22) Filed: Mar. 25, 2021

(65) Prior Publication Data
US 2021/0335013 A1 Oct. 28, 2021

(30) Foreign Application Priority Data
Apr. 27, 2020 (CN) .......................... 202010347224.5

(51) Int. Cl.
*G01N 21/21* (2006.01)
*G06F 17/11* (2006.01)
(Continued)

(52) U.S. Cl.
CPC .............. *G06T 7/97* (2017.01); *G01N 21/21* (2013.01); *G06F 17/11* (2013.01); *G06F 17/16* (2013.01)

(58) Field of Classification Search
CPC .... G01J 4/04; G01J 4/00; G01J 3/0224; G01J 3/447; G01J 4/02; G01N 21/21;
(Continued)

(56) References Cited

U.S. PATENT DOCUMENTS

| 2021/0199417 A1* | 7/2021 | Choi | G02B 21/0056 |
| 2021/0235006 A1* | 7/2021 | Ono | G06T 5/50 |
| 2022/0125280 A1* | 4/2022 | Tyan | A61B 5/0035 |

FOREIGN PATENT DOCUMENTS

| CN | 102742258 B | * 10/2016 | ........... G02B 27/286 |
| JP | WO2020110595 A1 | * 11/2021 | |

(Continued)

*Primary Examiner* — Ian L Lemieux
*Assistant Examiner* — Woo C Rhim
(74) *Attorney, Agent, or Firm* — JCIPRNET

(57) ABSTRACT

A method for characterizing polarization image information and a method for computing characterization parameters are provided. The method includes: obtaining n polarized subimages of a polarization imaging target, wherein each polarized subimage corresponds to a different polarization angle and $n \geq 3$; and computing a parameter matrix $[I_{LP}(x, y)\ I_{NLP}(x, y)\ \theta(x, y)]$ of a polarization cosine characterization equation of all pixel points of the polarization imaging target according to all polarized subimages and the polarization cosine characterization equation of the polarization imaging target. The disclosure obtains a maximum polarization intensity image and a minimum polarization intensity image through computing multiple polarization intensity images, which improves the accuracy of polarization imaging, and the degree of accuracy is much higher than macroscopic accuracy. The disclosure computes polarization cosine characterization parameters through the least squares fitting, which can also effectively reduce the influence of an experimental error on the experimental result.

12 Claims, 2 Drawing Sheets

---

S1. Obtain *n* polarized subimages of a polarization imaging target, wherein each polarized subimage corresponds to a different polarization angle and
$n \geq 3$

↓

S2. Compute a parameter matrix of a polarization cosine characterization equation of the polarization imaging target according to all polarized subimages and the polarization cosine characterization equation of the polarization imaging target

(51) Int. Cl.
*G06F 17/16* (2006.01)
*G06T 7/00* (2017.01)

(58) Field of Classification Search
CPC ............... G02B 27/286; G02B 5/3025; G02B 21/0092; G02B 27/28; G01B 2290/70; G06T 7/97; G06F 17/11; G06F 17/16
See application file for complete search history.

(56) References Cited

FOREIGN PATENT DOCUMENTS

| WO | WO-2020085149 A1 | * | 4/2020 | ........... G02B 27/286 |
| WO | WO-2020110594 A1 | * | 6/2020 | ............. G02B 27/28 |

* cited by examiner

METHOD FOR CHARACTERIZING POLARIZATION IMAGE INFORMATION AND METHOD FOR COMPUTING CHARACTERIZATION PARAMETERS

CROSS-REFERENCE TO RELATED APPLICATION

This application claims the priority benefit of China application no. 202010347224.5, filed on Apr. 27, 2020. The entirety of the above mentioned patent application is hereby incorporated by reference herein and made a part of this specification.

BACKGROUND

Technical Field

The disclosure relates to the field of imaging technology, and more specifically relates to a method for characterizing polarization image information and a method for computing characterization parameters.

Description of Related Art

Clear imaging of a target in a scattering medium is an important research direction of image processing technology, and has good application prospects in underwater detection, military reconnaissance in complex environments, intelligent driving in fog, etc. When imaging in a scattering medium, due to the absorption and scattering of the light beam by scattering particles, a large amount of scattering noise is caused, and the signal light is greatly attenuated, such that the imaging quality is seriously reduced and it is difficult to obtain the expected effect.

The current methods for the imaging of scattering media mainly include associated imaging technology, blind deconvolution algorithm technology, speckle imaging technology, structured light imaging technology, computational light field technology, polarization imaging technology, and so on. The polarization imaging technology is an effective solution to the issues of scattering imaging, and has the advantages of convenient operation, simple structure, real-time imaging of a large field of view, etc.

However, there are still some defects in the research of the polarization imaging technology. When using the polarization imaging technology, it is often necessary to acquire a maximum polarization intensity image and a minimum polarization intensity image of the polarization imaging target. The traditional acquisition method is to rotate the polarizer to find the maximum and minimum polarization intensity images through macroscopic observation, but such method is very easy to cause human error. Moreover, errors generated during the experimental process cannot be distinguished and resolved, which greatly limits the accuracy of polarization image processing.

SUMMARY

In view of the issue of finding a maximum polarization intensity image and a minimum polarization intensity image in existing polarization imaging, the disclosure provides a method for characterizing polarization image information and a method for computing characterization parameters. The objective is to compute polarized subimages with the maximum intensity and the minimum intensity through acquired polarized subimages, which improves the accuracy of polarization imaging.

To achieve the above objective, according to a first aspect of the disclosure, a method for characterizing polarization image information is provided. A polarizer is located between a detector and a polarization imaging target, and is placed close to the detector to cover the full aperture of the detector. A polarization cosine characterization equation is as follows:

$$I(t, x, y) = I_{LP}(x, y) \cos^2(t - \theta(x, y)) + I_{NLP}(x, y),$$

where $I(t, x, y)$ is the polarization intensity value of a pixel point $(x, y)$ observed by an observer when the polarization angle of the polarizer is t, $I_{LP}(x, y)$ is the linear polarization intensity of the pixel point, $I_{NLP}(x, y)$ is the non-linear polarization intensity of the pixel point, $\theta(x, y)$ is the polarization angle of the pixel point, and t represents the polarization angle of the polarizer when the polarizer is used to observe the polarization imaging target.

To achieve the above objective, according to a second aspect of the disclosure, a method for computing characterization parameters of the polarization image information described in the first aspect is provided. The method includes the following steps.

Step S1. n polarized subimages of the polarization imaging target are obtained, where n≥3. Each polarized subimage corresponds to a different polarization angle.

Step S2. A parameter matrix $[I_{LP}(x, y)\ I_{NLP}(x,y)\ \theta(x,y)]$ of the polarization cosine characterization equation of all pixel points of the polarization imaging target is computed according to all polarized subimages and the polarization cosine characterization equation of the polarization imaging target.

Preferably, the linear least squares matrix computation is used to compute the parameter matrix of the polarization cosine characterization equation of all pixel points of the polarization imaging target.

Preferably, Step S2 includes the following substeps.

Step S21. The polarization cosine characterization equation is converted into a linear form:

$$I(t, x, y) = \cos^2 t * I_{LP}(x, y) * [\cos^2 \theta(x, y) - \sin^2 \theta(x, y)] + \\ 2 \cos t \sin t * I_{LP}(x, y) \sin \theta(x, y) \cos \theta(x, y) + \\ [I_{NLP}(x, y) + I_{LP}(x, y) * \sin^2 \theta(x, y)],$$

and polarization image data obtained at different polarization angles is brought into the linear form to obtain a matrix equation:

$$\begin{bmatrix} \cos^2 t_1 & 2\sin t_1 \cos t_1 & 1 \\ \cos^2 t_2 & 2\sin t_2 \cos t_2 & 1 \\ \vdots & \vdots & \\ \cos^2 t_n & 2\sin t_n \cos t_n & 1 \end{bmatrix}$$

$$\begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta \end{bmatrix} = \begin{bmatrix} I(t_1, x, y) \\ I(t_2, x, y) \\ \vdots \\ I(t_n, x, y) \end{bmatrix},$$

where $t=[t_1\ t_2\ \ldots\ t_n]$ represents different polarization angles, the independent variable matrix in sample data is $$X = \begin{bmatrix} \cos^2 t_1 & 2\sin t_1 \cos t_1 & 1 \\ \cos^2 t_2 & 2\sin t_2 \cos t_2 & 1 \\ \vdots & \vdots & \vdots \\ \cos^2 t_n & 2\sin t_n \cos t_n & 1 \end{bmatrix},$$

the coefficient matrix to be solved is $$\hat{\beta}(x, y) = \begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta(x, y) \end{bmatrix},$$

is the dependent variable matrix in the sample data is $$\hat{Y}(x, y) = \begin{bmatrix} I(t_1, x, y) \\ I(t_2, x, y) \\ \vdots \\ I(t_n, x, y) \end{bmatrix},$$

and I ($t_i$, x, y) represents the intensity value of a pixel point with coordinates (x, y) in an i-th polarized subimage, where i=1,2, ..., n.

Step S22. The matrix X and the matrix $\hat{Y}$ are substituted into $\hat{\beta}(x, y) = (X^T X)^{-1} X^T \hat{Y}(x, y)$ to compute the coefficient matrix $\hat{\beta}(x, y)$ of any pixel point.

Step S23. According to the coefficient matrix $\hat{\beta}(x,y)$, the parameter matrix [$I_{LP}(x, y)$ $I_{NLP}(x, y)$ $\theta(x, y)$] of polarization cosine characterization of any pixel point is solved to obtain a linear polarization intensity image $I_{LP}$, a non-linear polarization intensity image $I_{NLP}$, and a polarization angle distribution picture θ of the polarization imaging target.

Preferably, the method further includes the following step. A maximum polarization intensity image $I_{max} = I_{LP} + I_{NLP}$ of the polarization imaging target is computed based on $I_{LP}$ and $I_{NLP}$.

Preferably, the method further includes the following step. A minimum polarization intensity image $I_{min} = I_{NLP}$ of the polarization imaging target is computed based on $I_{LP}$ and $I_{NLP}$.

Preferably, the method further includes the following step. The polarization angle t and the computed parameter matrix [$I_{LP}$ (x, y) $I_{NLP}$(x, y) θ(x, y)] are substituted into the polarization cosine characterization equation. The polarization intensity of any pixel at each polarization angle is obtained through changing the polarization angle t of the polarizer, thereby obtaining a polarization image of the polarization imaging target in the polarization direction.

In general, through the above technical solutions conceived in the disclosure, the following beneficial effects can be achieved.

(1) In view of the issue of finding the maximum polarization intensity image and the minimum polarization intensity image in traditional polarization imaging, the disclosure obtains the maximum polarization intensity image and the minimum polarization intensity image through computing multiple polarization intensity images, which improves the accuracy of polarization imaging, and the degree of accuracy is much higher than macroscopic accuracy.

(2) In view of the issue of an experimental error generated during the polarization imaging process, the disclosure computes polarization cosine characterization parameters through the least squares fitting, which can also effectively reduce the influence of the experimental error on the experimental result.

(3) Compared with the prior art, by adopting polarization information of several different polarization angles for direct computation, the polarization cosine characterization equation provided by the disclosure determines a polarization information standard model of each pixel point, so that the described polarization information is more accurate and intuitive.

DETAILED DESCRIPTION OF DISCLOSED EMBODIMENTS

For the objective, technical solutions, and advantages of the disclosure to be clearer, the disclosure is further described in detail below with reference to the accompanying drawings and the embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

The disclosure provides a method for characterizing polarization image information. A polarizer is located between a detector and a polarization imaging target, and is placed close to the detector to cover the full aperture of the detector. A polarization cosine characterization equation is as follows:

$$I(t, x, y) = I_{LP}(x, y) \cos^2(-\theta(x, y)) + I_{NLP}(x, y),$$

where I (t, x, y) is the polarization intensity value of a pixel point (x, y) observed by an observer when the polarization angle of the polarizer is t, $I_{LP}$ (x, y) is the linear polarization intensity of the pixel point, $I_{NLP}$(X, y) is the non-linear polarization intensity of the pixel point, θ(x, y) is the polarization angle of the pixel point, and t represents the polarization angle of the polarizer when the polarizer is used to observe the polarization imaging target. [t−θ(x,y)] represents the included angle between the polarization angle θ(x,y) of maximum polarization intensity of the pixel point and the polarization angle t of the polarizer and $\cos^2(t-\theta(x, y))$ refers to the projection of the maximum polarization intensity of the pixel point in the polarization direction of the polarizer.

Figure 1:
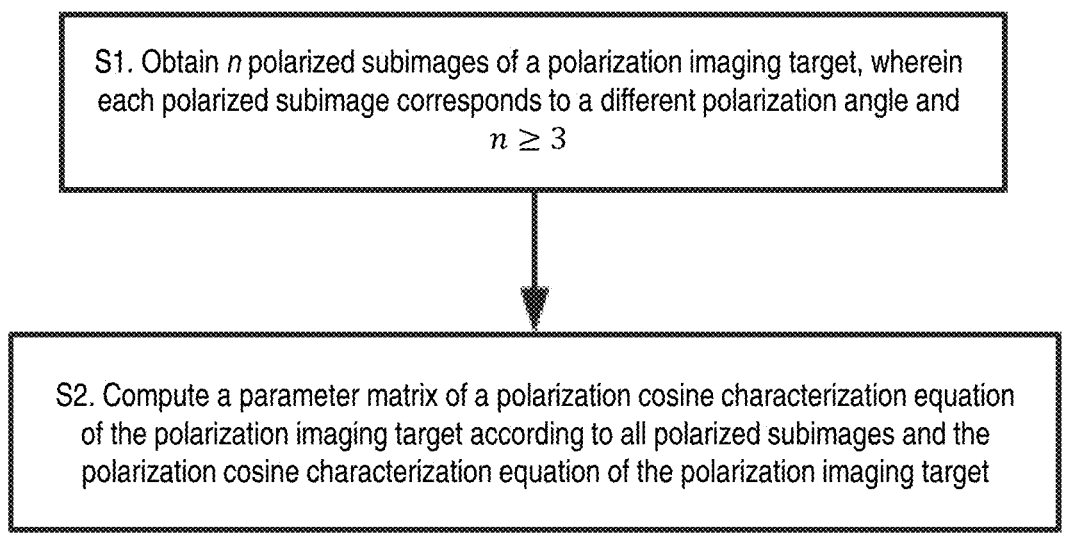
FIG. 1 is a flowchart of a fast computation method for characterization parameters of polarization image information according to an embodiment of the disclosure.

As shown in FIG. 1, the disclosure also provides a method for computing characterization parameters of the polarization image information. The method includes the following steps.

Step S1. Obtain n polarized subimages of the polarization imaging target, where n≥3. Each polarized subimage corresponds to a different polarization angle.

Figure 2:
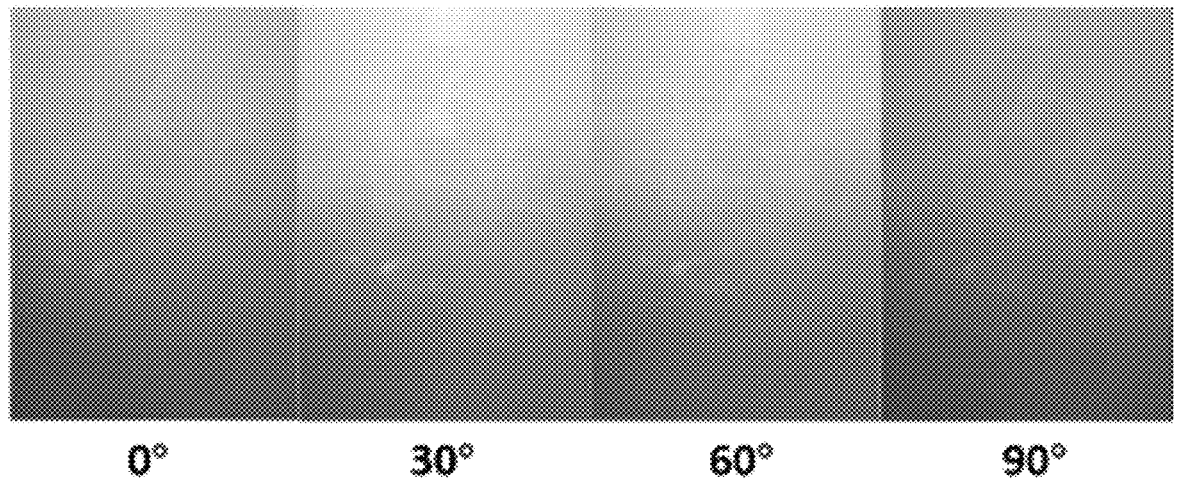
FIG. 2 shows four polarization intensity images of a polarization imaging target in polarization directions of 0°, 30°, 60°, and 90° according to an embodiment of the disclosure.
Figures 3A, 3B, 3C, 3D:
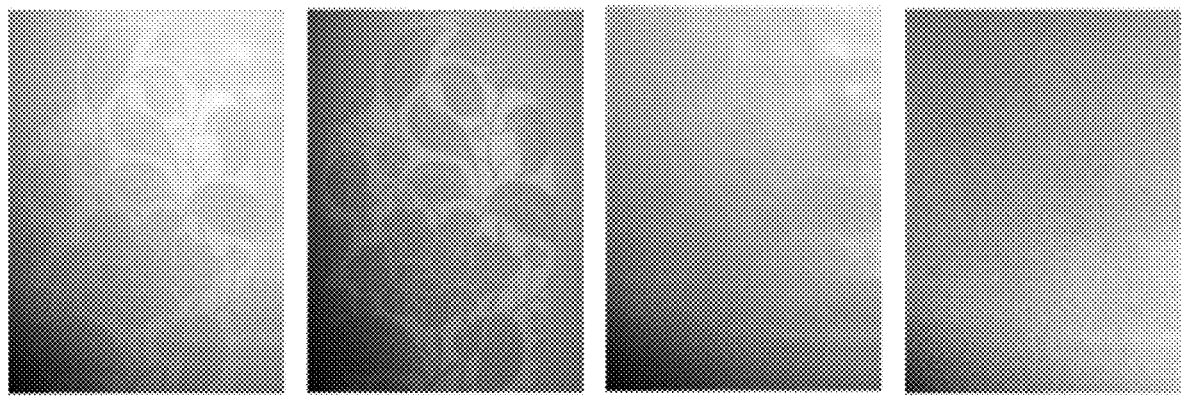
FIG. 3A is an original intensity image of the polarization imaging target according to an embodiment of the disclosure.
FIG. 3B is a linear polarization intensity image $I_{LP}$ of the polarization imaging target according to an embodiment of the disclosure.
FIG. 3C is a non-linear polarization intensity image $I_{NLP}$ of the polarization imaging target according to an embodiment of the disclosure.
FIG. 3D is a polarization angle distribution picture θ of the polarization imaging target according to an embodiment of the disclosure.

The polarized subimages of the polarization imaging target are measured at different polarization angles and are not less than three. The polarized subimages of the polarization imaging target may be acquired through various methods, such as using a polarization camera. In this embodiment, the polarization imaging target is a texture pattern. The polarizer is located between the detector and the polarization imaging target, and is placed close to the detector to cover the full aperture of the detector. The polarization angle is adjusted through rotating the polarizer. In this embodiment, the polarization angle in the horizontal direction is set to 0°, as shown in FIG. 2, four polarization intensity images I(0°), I(30°), I(60°), and I(90°) of the polarization imaging target in polarization directions of 0°, 30°, 60°, and 90° are respectively acquired. The more images acquired, the more accurate the processing result. Considering the complicated operation during imaging, 4 to 6 images may be acquired.

Step S2. Compute a parameter matrix $[I_{LP}(x, y)\ I_{NLP}(x,y)\ \theta(x,y)]$ of the polarization cosine characterization equation of all pixel points of the polarization imaging target according to all polarized subimages and the polarization cosine characterization equation of the polarization imaging target.

Preferably, the linear least squares matrix computation is used to compute the parameter matrix of the polarization cosine characterization equation of all pixel points of the polarization imaging target.

Preferably, Step S2 includes the following substeps.

Step S21. Convert the polarization cosine characterization equation into a linear form:

$$I(t, x, y) = \cos^2 t * I_{LP}(x, y) * [\cos^2 \theta(x, y) - \sin^2 \theta(x, y)] +$$
$$2 \cos t \sin t * I_{LP}(x, y) \sin \theta(x, y) \cos \theta(x, y) +$$
$$[I_{NLP}(x, y) + I_{LP}(x, y) * \sin^2 \theta(x, y)],$$

and bring polarization image data obtained at different polarization angles into the linear form to obtain a matrix equation:

$$\begin{bmatrix} \cos^2 t_1 & 2\sin t_1 \cos t_1 & 1 \\ \cos^2 t_2 & 2\sin t_2 \cos t_2 & 1 \\ \vdots & & \vdots \\ \cos^2 t_n & 2\sin t_n \cos t_n & 1 \end{bmatrix} \begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta \end{bmatrix} = \begin{bmatrix} I(t_1, x, y) \\ I(t_2, x, y) \\ \vdots \\ I(t_n, x, y) \end{bmatrix},$$

where $t=[t_1\ t_2\ \ldots\ t_n]$ represents different polarization angles, the independent variable matrix in sample data is $$X = \begin{bmatrix} \cos^2 t_1 & 2\sin t_1 \cos t_1 & 1 \\ \cos^2 t_2 & 2\sin t_2 \cos t_2 & 1 \\ \vdots & & \vdots \\ \cos^2 t_n & 2\sin t_n \cos t_n & 1 \end{bmatrix},$$

the coefficient matrix to be solved is $$\hat{\beta}(x, y) = \begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta(x, y) \end{bmatrix},$$

the dependent variable matrix in the sample data is $$\hat{Y}(x, y) = \begin{bmatrix} I(t_1, x, y) \\ I(t_2, x, y) \\ \vdots \\ I(t_n, x, y) \end{bmatrix},$$

and $I(t_i, x, y)$ represents the intensity value of a pixel point with coordinates $(x, y)$ in an i-th polarized subimage, where $i=1,2,\ldots,n$.

In this embodiment, the polarization angle of the polarized subimage is $t=[0°\ 30°\ 60°\ 90°]$, so the computed independent variable matrix is:

$$X = \begin{bmatrix} 1 & 0 & 1 \\ 1/4 & \sqrt{3}/2 & 1 \\ 3/4 & \sqrt{3}/2 & 1 \\ 0 & 0 & 1 \end{bmatrix},$$

and the dependent variable matrix in the sample data is:

$$\hat{Y}(x, y) = \begin{bmatrix} I(0°, x, y) \\ I(30°, x, y) \\ I(60°, x, y) \\ I(90°, x, y) \end{bmatrix}.$$

Step S22. Substitute the matrix X and the matrix $\hat{Y}$ into $\hat{\beta}(x, y) = (X^T X)^{-1} X^T \hat{Y}(x,y)$ to compute the coefficient matrix $\hat{\beta}(x,y)$ of any pixel point:

$$\hat{\beta}(x, y) = (X^T X)^{-1} X^T \hat{Y}(x, y),$$

where X represents the independent variable matrix in the sample data, $\hat{y}$ represents the dependent variable matrix in the sample data, and $\hat{\beta}$ is the coefficient matrix to be solved. Here, X is required to be a singular matrix. Using the linear least squares matrix to compute polarization cosine characterization expression parameters may reduce the influence of an experimental data error on the processing result to a certain extent.

The independent variable matrix X and the dependent variable matrix $\hat{Y}$ are substituted into the equation $\hat{\beta}(x, y) = (X^T X)^{-1} X^T \hat{Y}(x, y)$ to obtain the result:

$$\hat{\beta}(x, y) = \begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta(x, y) \end{bmatrix} =$$

-continued $$\begin{bmatrix} 0.8000 & 0.4000 & -0.4000 & -0.8000 \\ -0.5774 & 0.5774 & 0.5774 & -0.5774 \\ 0.1000 & -0.2000 & 0.2000 & 0.9000 \end{bmatrix} \cdot \begin{bmatrix} I(0°, x, y) \\ I(30°, x, y) \\ I(60°, x, y) \\ I(90°, x, y) \end{bmatrix}.$$

Step S23. According to the coefficient matrix $\hat{\beta}(x,y)$, the parameter matrix $[I_{LP}(x, y)\ I_{NLP}(x, y)\ \theta(x, y)]$ of polarization cosine characterization of any pixel point is solved to obtain a linear polarization intensity image $I_{LP}$, a non-linear polarization intensity image $I_{NLP}$, and a polarization angle distribution picture $\theta$ of the polarization imaging target.

After the matrix $\hat{\beta}(x,y)$ is solved in Step S22, a set of ternary quadratic equations regarding the parameters to be solved $I_{LP}(x,y)$, $I_{NLP}(x,y)$, $\theta(x,y)$ is established, which is simultaneously solved to obtain the parameter matrix $[I_{LP}(x, y)\ I_{NLP}(x,y)\ \theta(x,y)]$ of polarization cosine characterization. The linear polarization intensity image $I_{LP}$, the non-linear polarization intensity image $I_{NLP}$, and the polarization angle distribution picture $\theta$ of the polarization imaging target obtained in this embodiment are respectively shown in FIGS. 3B, 3C, and 3D, and FIG. 3A is the original intensity image for comparison.

Preferably, the method further includes the following step. A maximum polarization intensity image $I_{max}=I_{LP}+I_{NLP}$ of the polarization imaging target is computed based on $I_{LP}$ and $I_{NLP}$.

Preferably, the method further includes the following step. A minimum polarization intensity image $I_{min}=I_{NLP}$ of the polarization imaging target is computed based on $I_{LP}$ and $I_{NLP}$.

Preferably, the method further includes the following step. The polarization angle t and the computed parameter matrix $[I_{LP}(x,y)\ I_{NLP}(x,y)\ \theta(x,y)]$ are substituted into the polarization cosine characterization equation. The polarization intensity of any pixel at each polarization angle is obtained through changing the polarization angle t of the polarizer, thereby obtaining a polarization image of the polarization imaging target at the polarization angle.

In this embodiment, the maximum polarization intensity image and the minimum polarization intensity image are computed through using several polarization intensity images, and the degree of accuracy is much higher than macroscopic accuracy.

Persons skilled in the art may easily understand that the above are only the preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for computing characterization parameters of polarization image information,
  wherein the method for computing characterization parameters of the polarization image information comprises:
  Step S1: obtaining n polarized subimages of the polarization imaging target, wherein each of the polarized subimages corresponds to a different polarization angle and n≥3, wherein a polarizer is located between a detector and a polarization imaging target, and is placed close to the detector to cover a full aperture of the detector;
  Step S2: computing a parameter matrix $[I_{LP}(x, y)\ I_{NLP}(x, y)\ \theta(x, y)]$ of a polarization cosine characterization equation of all pixel points of the polarization imaging target according to all of the polarized subimages and the polarization cosine characterization equation of the polarization imaging target, wherein the polarization cosine characterization equation is as follows:

$I(t, x, y)=I_{LP}(x, y)\cos^2(t-\theta(x, y))+I_{NLP}(x, y)$, where $I(t, x, y)$ is a polarization intensity value of a pixel point (x, y) observed by an observer when a polarization angle of the polarizer is t, t, $I_{LP}(x, y)$ is a linear polarization intensity of the pixel point, $I_{NLP}(x, y)$ is a non-linear polarization intensity of the pixel point, $\theta(x, y)$ is a polarization angle of the pixel point, and t represents the polarization angle of the polarizer when the polarizer is used to observe the polarization imaging target, $(t-\theta(x, y))$ represents an included angle between the polarization angle $\theta(x, y)$ of maximum polarization intensity of the pixel point and the polarization angle t of the polarizer and $\cos^2(t-\theta(x, y))$ refers to a projection of the maximum polarization intensity of the pixel point in a polarization direction of the polarizer; and
  Step S3: obtaining a polarization image of the polarization imaging target at a given polarization angle of the polarizer by the polarization cosine characterization equation and the parameter matrix obtained in Step 2, to improve an accuracy of the polarization image of the polarization imaging target at the given polarization angle.

2. The method of claim 1, wherein a linear least squares matrix computation is used to compute the parameter matrix of the polarization cosine characterization equation of all of the pixel points of the polarization imaging target.

3. The method of claim 1, wherein Step S2 comprises:
  Step S21: converting the polarization cosine characterization equation into a linear form $$I(t, x, y) = \cos^2 t * I_{LP}(x, y) * [\cos^2 \theta(x, y) - \sin^2 \theta(x, y)] +$$
$$2 \cos t \sin t * I_{LP}(x, y) \sin \theta(x, y) \cos \theta(x, y) +$$
$$[I_{NLP}(x, y) + I_{LP}(x, y) * \sin^2 \theta(x, y)],$$

and bringing polarization image data obtained at different polarization angles into the linear form to obtain a matrix equation:

$$\begin{bmatrix} \cos^2 t_1 & 2\sin t_1 \cos t_1 & 1 \\ \cos^2 t_2 & 2\sin t_2 \cos t_2 & 1 \\ \vdots & \vdots & \\ \cos^2 t_n & 2\sin t_n \cos t_n & 1 \end{bmatrix}$$

$$\begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta \end{bmatrix} = \begin{bmatrix} I(t_1, x, y) \\ I(t_2, x, y) \\ \vdots \\ I(t_n, x, y) \end{bmatrix},$$

where $t=[t_1\ t_2\ \ldots\ t_n]$ represents different polarization angles, an $$X = \begin{bmatrix} \cos^2 t_1 & 2\sin t_1 \cos t_1 & 1 \\ \cos^2 t_2 & 2\sin t_2 \cos t_2 & 1 \\ \vdots & \vdots & \vdots \\ \cos^2 t_n & 2\sin t_n \cos t_n & 1 \end{bmatrix},$$

independent variable matrix in sample data is $$\hat{\beta}(x, y) = \begin{bmatrix} I_{LP}(x, y)[\cos^2 \theta(x, y) - \sin^2 \theta(x, y)] \\ I_{LP}(x, y) \sin \theta(x, y) \cos \theta(x, y) \\ I_{NLP}(x, y) + I_{LP}(x, y) \sin^2 \theta(x, y) \end{bmatrix},$$

a coefficient matrix to be solved is a $$\hat{Y}(x, y) = \begin{bmatrix} I(t_1, x, y) \\ I(t_2, x, y) \\ \vdots \\ I(t_n, x, y) \end{bmatrix},$$

dependent variable matrix in the sample data and $I(t_i, x, y)$ represents an intensity value of a pixel point with coordinates (x, y) in an i-th polarized subimage, where i=1, 2, ..., n;

Step S22: substituting the matrix X and the matrix Ŷ into $\hat{\beta}(x, y) = (X^T X)^{-1} X^T \hat{Y}(x, y)$ to compute the coefficient matrix $\hat{\beta}(x, y)$ of any pixel point; and Step S23: solving the parameter matrix [$I_{LP}$ (x, y) $I_{NLP}$(x, y) θ(x, y)] of polarization cosine characterization of any pixel point according to the coefficient matrix $\hat{\beta}(x, y)$ to obtain a linear polarization intensity image $I_{LP}$, a non-linear polarization intensity image $I_{NLP}$, and a polarization angle distribution picture θ of the polarization imaging target.

4. The method of claim 1, further comprising: computing a maximum polarization intensity image $I_{max}=I_{LP}+I_{NLP}$ of the polarization imaging target based on $I_{LP}$ and $I_{NLP}$.

5. The method of claim 1, further comprising: computing a minimum polarization intensity image $I_{min}=I_{NLP}$ of the polarization imaging target based on $I_{LP}$ and $I_{NLP}$.

6. The method of claim 1, further comprising: substituting the polarization angle t and the computed parameter matrix [$I_{LP}$ (x, y) $I_{NLP}$(x, y) θ(x, y)] into the polarization cosine characterization equation, and obtaining a polarization intensity of any pixel at each polarization angle through changing the polarization angle t of the polarizer, thereby obtaining a polarization image of the polarization imaging target in the polarization direction.

7. The method of claim 2, further comprising: computing a maximum polarization intensity image $I_{max}=I_{LP}+I_{NLP}$ of the polarization imaging target based on $I_{LP}$ and $I_{NLP}$.

8. The method of claim 2, further comprising: computing a minimum polarization intensity image $I_{min}=I_{NLP}$ of the polarization imaging target based on $I_{LP}$ and $I_{NLP}$.

9. The method of claim 2, further comprising: substituting the polarization angle t and the computed parameter matrix [$I_{LP}$ (x, y) $I_{NLP}$(x, y) θ(x, y)] into the polarization cosine characterization equation, and obtaining a polarization intensity of any pixel at each polarization angle through changing the polarization angle t of the polarizer, thereby obtaining a polarization image of the polarization imaging target in the polarization direction.

10. The method of claim 3, further comprising: computing a maximum polarization intensity image $I_{max}=I_{LP}+I_{NLP}$ of the polarization imaging target based on $I_{LP}$ and $I_{NLP}$.

11. The method of claim 3, further comprising: computing a minimum polarization intensity image $I_{min}=I_{NLP}$ of the polarization imaging target based on $I_{LP}$ and $I_{NLP}$.

12. The method of claim 3, further comprising: substituting the polarization angle t and the computed parameter matrix [$I_{LP}$ (x, y) $I_{NLP}$(x, y) θ(x, y)] into the polarization cosine characterization equation, and obtaining a polarization intensity of any pixel at each polarization angle through changing the polarization angle t of the polarizer, thereby obtaining a polarization image of the polarization imaging target in the polarization direction.

* * * * *